(12) United States Patent
Folsberg et al.

(10) Patent No.: US 8,113,452 B2
(45) Date of Patent: Feb. 14, 2012

(54) ROLLER MILL

(75) Inventors: Jan Folsberg, Roskilde (DK); Rainer Closter Jespersen, Lyngby (DK)

(73) Assignee: FLSmidth A/S, Valby (DK)

( * ) Notice: Subject to any disclaimer, the term of this patent is extended or adjusted under 35 U.S.C. 154(b) by 145 days.

(21) Appl. No.: 12/747,739

(22) PCT Filed: Sep. 25, 2008

(86) PCT No.: PCT/EP2008/062824
§ 371 (c)(1),
(2), (4) Date: Jun. 11, 2010

(87) PCT Pub. No.: WO2009/074363
PCT Pub. Date: Jun. 18, 2009

(65) Prior Publication Data
US 2010/0258661 A1 Oct. 14, 2010

(30) Foreign Application Priority Data
Dec. 11, 2007 (DK) .................................. 2007 01764

(51) Int. Cl.
*B02B 1/00* (2006.01)
*B02C 11/08* (2006.01)
*B07B 4/00* (2006.01)
(52) U.S. Cl. ........................... 241/57; 241/119; 241/121
(58) Field of Classification Search .................... 241/57, 241/119, 121
See application file for complete search history.

(56) References Cited

U.S. PATENT DOCUMENTS

| 4,155,511 | A |   | 5/1979  | Kartmann |         |
|-----------|---|---|---------|----------|---------|
| 4,485,974 | A |   | 12/1984 | Lass     |         |
| 4,489,895 | A |   | 12/1984 | Petersen |         |
| 4,582,260 | A |   | 4/1986  | Folsberg |         |
| 4,715,544 | A | * | 12/1987 | Folsberg | 241/57  |
| 4,869,434 | A | * | 9/1989  | Folsberg | 241/34  |

(Continued)

FOREIGN PATENT DOCUMENTS
DE 3409710 A1 9/1984

OTHER PUBLICATIONS
International Search Report PCT/EP2008/062824 International Filing Date Sep. 25, 2008 Applicant FLSmidth A/S.

*Primary Examiner* — Bena Miller
(74) *Attorney, Agent, or Firm* — Buchanan Ingersoll & Rooney PC

(57) ABSTRACT

A roller mill for grinding particulate material such as cement raw materials, cement clinker and the like includes a grinding table and a set of rollers rotatable about a vertical shaft. The set of rollers include a number of rollers rotating about separate roller shafts, which are connected to the vertical shaft. A nozzle ring for directing gases into the roller mill is also included. The nozzle ring encloses the grinding table. Means for regulating the gas flow through the nozzle ring is also provided. At least some of the regulation means are arranged to rotate together with the rollers. Preferably, the position of at least some of the regulation means for regulating gas flow through the nozzle ring relative to the rollers may remain the same so that the gases introduced into the mill via the nozzle ring may exhibit the same flow pattern in relation to the rollers.

20 Claims, 1 Drawing Sheet

U.S. PATENT DOCUMENTS

| | | |
|---|---|---|
| 5,405,091 A | 4/1995 | Folsberg |
| 5,676,318 A * | 10/1997 | Yokoyama et al. ........ 241/24.14 |
| 5,823,450 A | 10/1998 | Folsberg |
| 6,745,960 B1 * | 6/2004 | Myo et al. .......................... 241/5 |
| 7,028,934 B2 | 4/2006 | Burynski, Jr. |
| 7,448,565 B2 * | 11/2008 | Farris ............................. 241/119 |
| 7,637,446 B2 | 12/2009 | Euculano |

* cited by examiner

ROLLER MILL

CROSS REFERENCE TO RELATED APPLICATIONS

The present patent application is the United States national phase under 35 U.S.C. §371 of International Application No. PCT/EP2008/062824, filed on Sep. 25, 2008, and claiming priority to Danish Patent Application No. PA 2007 01764, filed on Dec. 11, 2007. The entirety of both of these applications are incorporated herein.

FIELD OF THE INVENTION

The present invention relates to a roller mill for grinding particulate material such as cement raw materials, cement clinker and the like, said roller mill comprising a grinding table, a set of rollers rotatable about a vertical shaft, said set of rollers comprising a number of rollers rotating about separate roller shafts, which are connected to the vertical shaft, and a nozzle ring for directing gases into the roller mill, said nozzle ring enclosing the grinding table, and means for regulating the gas flow through the nozzle ring.

Roller mills comprising a grinding table and a therewith interactively operating and rotating set of rollers are known. Also known are roller mills comprising a nozzle ring enclosing the grinding table. Roller mills comprising a combination of these characteristics are not known to the applicant filing the present patent application, however, such are considered to be obvious.

In connection with the operation of roller mills of the kind mentioned in the introduction, it is reasonable to assume that the material which is ejected from the table will be unevenly distributed across the circumference of the grinding table, and that the load on the nozzle ring therefore will be high in some areas and low in other areas. At the same time, it is reasonable to assume that the areas with high and low load, respectively, on the nozzle ring will move constantly with the rotating set of rollers. This uneven distribution of the load imposed by the material on the nozzle ring is envisaged to necessitate adjustment of the gas flow through the nozzle ring for optimizing the mill performance in terms of capacity, grinding efficiency and energy consumption.

SUMMARY OF THE INVENTION

It is the object of the present invention to provide a roller mill by means of which the aforementioned disadvantages are reduced.

This is obtained by means of a roller mill of the kind mentioned in the introduction and being characterized in that at least some of the regulation means are arranged to rotate together with the set of rollers.

Hence it will be possible to ensure optimum regulation of the gas flow through the nozzle ring in relation to the uneven load imposed by the material, thereby optimizing the roller mill operation in terms of capacity, grinding efficiency and energy consumption. This is ascribable to the fact that the position of at least some of the regulation means for regulating the gas flow through the nozzle ring relative to the set of rollers remains the same at all times, and the fact the gases which are introduced into the mill via the nozzle ring will, therefore, always exhibit the same flow pattern in relation to the set of rollers.

In principle, the regulation means may be rotated using any appropriate means. However, it is preferred that the regulation means are connected to the vertical shaft to which the set of rollers is also connected. This will ensure that the set of rollers and the regulation means rotate at exactly the same angular velocity. In an alternative embodiment, the regulation means may, by use of appropriate means, be connected for example to the roller shafts or other parts of the rollers close to the nozzle ring.

The regulation means in the circumferential direction may be divided into sections, each of which may be configured in a number of different ways. For optimum utilization of the gases introduced into the roller mill through the nozzle ring and to minimize the fall-through of material through the nozzle ring it is preferred that some of the sections of the regulation means are blanked off. Hence it will be possible to introduce the gases into the roller mill at the exact locations where the greatest material load is imposed on the nozzle ring. It is preferred that the sections of the regulation means located immediately opposite each roller are blanked off since the lowest material load will typically be imposed on these sections, and since the wear rate on the rollers is hereby significantly reduced.

All or some of the sections of the regulation means may be gas flow regulation devices or gas flow regulation mechanisms that are sized and configured to regulate gas flow. The regulation means may be configured with lamellae or other forms of guiding faces which direct the gas into the roller mill at different angles relative to the vertical plane. Hence the regulation means may for example be configured with sections comprising rear-facing, forward-facing or vertical lamellae and possibly blanked-off sections.

In addition, as a supplement to the rotatable regulation means, stationary regulation means may be provided in the nozzle ring. These stationary regulation means may also be configured with sections comprising rear-facing, forward-facing or vertical lamellae.

BRIEF DESCRIPTION OF THE DRAWINGS

The invention will now be explained in further details with reference to the drawings, in which.

DETAILED DESCRIPTION OF PRESENT PREFERRED EMBODIMENTS

Figure 1:
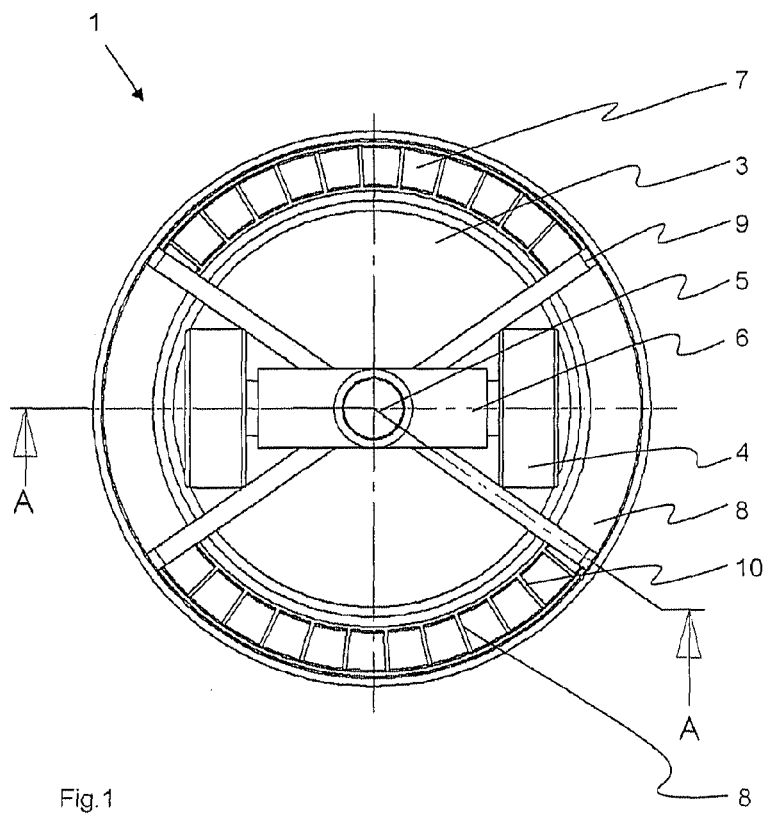
FIG. 1 shows a sectional view of an embodiment of a roller mill according to the invention viewed from the top.

In FIG. 1 is seen a sectional view of a roller mill 1 which comprises a horizontal grinding table 3 and a set of rollers 4 interacting therewith, said rollers being connected to and rotating about a vertical shaft 5. The rollers 4 rotate about separate roller shafts 6 which are connected to the vertical shaft 5. The roller mill also comprises a nozzle ring 7 which encloses the grinding table 3 and means 8 for regulating the gas flow through the nozzle ring 7 and into the roller mill 1.

According to the invention at least some of the regulation means 8 are arranged to rotate together with the rollers 4, thereby ensuring that the position of the regulation means 8 relative to the rollers 4 remains the same at all times and that gases directed into the mill 1 via the nozzle ring 7 always exhibit the same flow pattern relative to the rollers 4. In this way the gas flow through the nozzle ring 7 can be regulated in an optimum manner relative to the non-uniform load imposed by the material, allowing the performance of the roller mill 1 to be optimized in terms of capacity, grinding efficiency and energy consumption.

Figure 2:
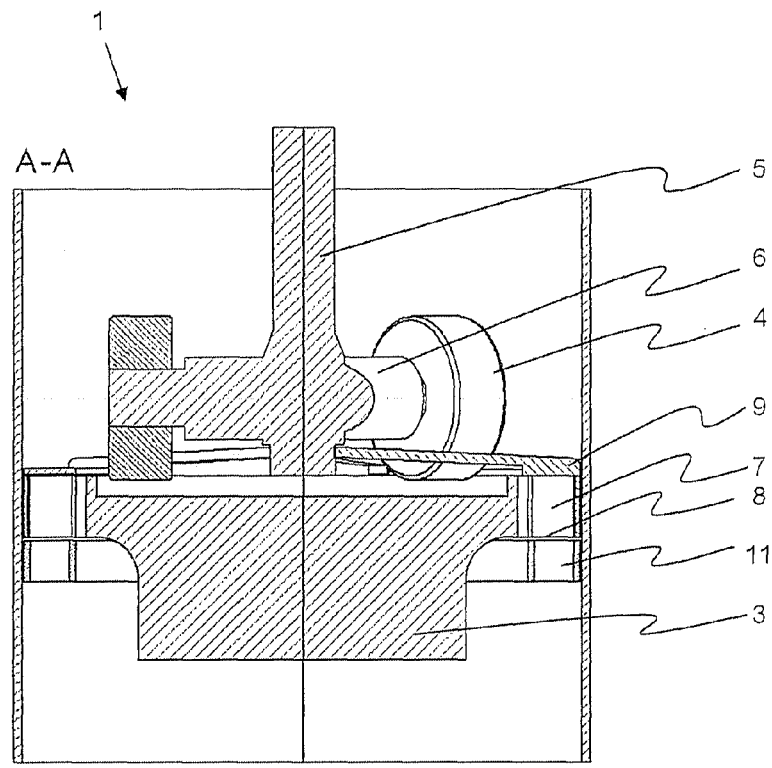
FIG. 2 is a cross-sectional view taken along line A-A in FIG. 1 of the embodiment of the roller mill.

In the embodiment shown in FIG. 2, the regulation means 8 are connected to the vertical shaft 5 by means of rods 9 so that the rotation of the rollers 4 and the regulation means 8 occurs at exactly the same angular velocity. The regulation means 8 may alternatively be connected to for example the roller shafts 6 or other parts of the rollers 4 close to or adjacent to the nozzle ring 7.

In the shown embodiment, see in particular FIG. 1, the regulation means 8 are divided into sections in the circumferential direction, and the sections which are located immediately opposite each roller 4 are blanked off since the load imposed by the material is typically lowest on these sections, and since the wear on the rollers is hereby significantly reduced. The other sections of the regulation means 8 are configured with rear-facing, forward-facing or vertical lamellae 10 which direct the gases into the roller mill at different angles relative to the vertical plane.

In addition, the shown roller mill comprises stationary regulation means 11, which are arranged in the nozzle ring 7 and are configured with sections comprising rear-facing, forward-facing or vertical lamellae.

While certain present preferred embodiments of the roller mill, and methods of making and using the same have been shown and described above, it is to be distinctly understood that the invention is not limited thereto but may be otherwise variously embodied and practiced within the scope of the following claims.

The invention claimed is:

1. A roller mill for grinding particulate material comprising:
    a grinding table;
    a set of rollers rotatable about a vertical shaft, each of the rollers rotating about a respective roller shaft connected to the vertical shaft;
    a nozzle ring sized and configured to direct at least one gas into the roller mill, the nozzle ring enclosing the grinding table; and
    regulation means for regulating a flow of the at least one gas through the nozzle ring, at least some of the regulation means being arranged to rotate together with the rollers.

2. The roller mill of claim 1 wherein the regulation means are connected to the vertical shaft, shaft.

3. The roller mill of claim 1 wherein the regulation means are connected to the roller shafts.

4. The roller mill of claim 1 wherein a portion of the regulation means are positioned in a circumferential direction and are divided into sections.

5. The roller mill of claim 4 wherein some of the sections of the regulation means are blanked off.

6. The roller mill of claim 4 wherein the sections of the regulation means located immediately opposite each roller are blanked off.

7. The roller mill of claim 4 wherein at least some of the sections of the regulation means are configured as lamellae or other forms of guiding faces which direct the at least one gas into the roller mill at different angles relative to a vertical plane.

8. The roller mill of claim 4 wherein the sections of the regulation means comprise at least one of rear-facing lamellae, rear-facing lamellae and vertical lamellae.

9. The roller mill of claim 1 wherein the regulation means is also comprised of stationary regulation means for regulating the flow of the at least one gas in the nozzle ring.

10. The roller mill of claim 9 wherein the stationary regulation means are configured with sections comprising rear-facing lamellae, rear-facing lamellae and vertical lamellae.

11. The roller mill of claim 1 wherein the regulation means is comprised of at least one mechanism sized and configured to regulate gas flow or at least one device sized and configured to regulate gas flow.

12. A roller mill comprising:
    a grinding table;
    a plurality of rollers rotatable about a vertical shaft, each of the rollers rotating about a respective roller shaft connected to the vertical shaft;
    a nozzle ring sized and configured to direct at least one gas into the roller mill, the nozzle ring positioned adjacent to the grinding table; and
    a plurality of gas flow regulation devices, each of the gas flow regulation devices sized and configured to regulate flow of the at least one gas through the nozzle ring, at least some of the gas flow regulation devices being positioned to rotate together with the rollers.

13. The roller mill of claim 12 wherein the at least some of the gas flow regulation devices positioned to rotate together with the rollers are comprised of at least one gas flow regulation device positioned to rotate at a same angular velocity as the rollers.

14. The roller mill of claim 12 further comprising rods, each of the rods being positioned between the vertical shaft and at least one of the gas flow regulation devices to connect that at least one gas flow regulation device to the vertical shaft.

15. The roller mill of claim 12 wherein at least one of the gas flow regulation devices are attached to a respective one of the roller shafts.

16. The roller mill of claim 12 wherein the gas flow regulation devices are comprised of a first set of gas flow regulation devices and a second set of gas flow regulation devices, each gas flow regulation device of the first set of gas flow regulation devices attached to one of the roller shafts, each gas flow regulation device of the second set of gas flow regulation devices attached to the vertical shaft.

17. The roller mill of claim 12 wherein at least some of the gas flow regulation devices are positioned below the rollers.

18. The roller mill of claim 12 wherein the gas flow regulation devices are also comprised of at least one gas flow regulation device that is arranged in the nozzle ring and is positioned such that that at least one gas flow regulation device is stationary.

19. The roller mill of claim 12 wherein each of the gas flow regulation devices is comprised of lamellae sized and configured to direct the at least one gas into the roller mill.

20. The roller mill of claim 12 wherein the gas flow regulation devices are comprised of a first set of gas flow regulation devices, a second set of gas flow regulation devices, and a third set of gas flow regulation devices, each gas flow regulation device of the first set of gas flow regulation devices attached to one of the roller shafts, each gas flow regulation device of the second set of gas flow regulation devices attached to the vertical shaft, each gas flow regulation device of the third set of gas flow regulation devices attached to a portion of a respective one of the rollers adjacent to the nozzle ring.

* * * * *